(12) United States Patent
Gupta

(10) Patent No.: US 8,520,894 B2
(45) Date of Patent: Aug. 27, 2013

(54) BACKGROUND IMAGE AND MASK ESTIMATION FOR ACCURATE SHIFT-ESTIMATION FOR VIDEO OBJECT DETECTION IN PRESENCE OF MISALIGNMENT

(75) Inventor: Amit Kumar Gupta, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 12/969,195

(22) Filed: Dec. 15, 2010

(65) Prior Publication Data

US 2011/0150282 A1 Jun. 23, 2011

(30) Foreign Application Priority Data

Dec. 18, 2009 (AU) ................................ 2009251048

(51) Int. Cl.
*G06K 9/00* (2006.01)
(52) U.S. Cl.
USPC ........... 382/103; 382/173; 382/224; 382/265; 382/164; 382/165
(58) Field of Classification Search
USPC ................. 382/103, 224, 164, 165, 173, 128, 382/131, 132
See application file for complete search history.

(56) References Cited

U.S. PATENT DOCUMENTS

| | | | | |
|---|---|---|---|---|
| 5,068,909 A * | 11/1991 | Rutherford et al. | | 382/302 |
| 5,991,428 A * | 11/1999 | Taniguchi | | 382/107 |
| 6,381,275 B1 * | 4/2002 | Fukuhara et al. | | 375/240.06 |
| 6,625,310 B2 * | 9/2003 | Lipton et al. | | 382/173 |
| 6,912,313 B2 | 6/2005 | Li | | 382/219 |
| 6,987,883 B2 * | 1/2006 | Lipton et al. | | 382/173 |
| 7,418,134 B2 * | 8/2008 | Schwartz et al. | | 382/173 |
| 7,536,032 B2 * | 5/2009 | Bell | | 382/107 |
| 8,000,498 B2 * | 8/2011 | Shih et al. | | 382/103 |
| 2002/0168091 A1 * | 11/2002 | Trajkovic | | 382/107 |
| 2002/0186881 A1 * | 12/2002 | Li | | 382/164 |
| 2003/0086621 A1 * | 5/2003 | Hata et al. | | 382/239 |
| 2004/0105573 A1 * | 6/2004 | Neumann et al. | | 382/103 |
| 2005/0157928 A1 * | 7/2005 | Kondo et al. | | 382/173 |

(Continued)

OTHER PUBLICATIONS

Ratakonda, K.; , "Real-time digital video stabilization for multimedia applications ," Circuits and Systems, 1998. ISCAS '98. Proceedings of the 1998 IEEE International Symposium on , vol. 4, no., pp. 69-72 vol. 4, May 31-Jun. 3, 1998.*
Examination Report, which issued on Mar. 7, 2012, in counterpart Australian application No. 2009251048.

*Primary Examiner* — Stephen R Koziol
*Assistant Examiner* — Shaghayegh Azima
(74) *Attorney, Agent, or Firm* — Fitzpatrick, Cella, Harper & Scinto

(57) ABSTRACT

Disclosed herein are a method, system, and computer program product for aligning an input video frame from a video sequence with a background model associated with said video sequence. The background model includes a plurality of model blocks (820, 830), each one of the plurality of model blocks (820, 830) being associated with at least one mode (821, 822, 823, 831, 832, 833, 834), wherein each mode (821, 822, 823, 831, 832, 833, 834) includes a plurality of frequency domain attributes. The method selects, for each one of the plurality of model blocks, a reference mode dependent upon a mode of the corresponding model block, generates a background reference image (840) comprising the plurality of selected reference blocks (841, 842), and then aligns the input frame with the background model (810), based on the background reference image (810).

11 Claims, 18 Drawing Sheets

(56) References Cited

U.S. PATENT DOCUMENTS

| | | | |
|---|---|---|---|
| 2006/0034520 A1* | 2/2006 | Toyama et al. | 382/224 |
| 2007/0086675 A1* | 4/2007 | Chinen et al. | 382/284 |
| 2007/0273765 A1* | 11/2007 | Wang et al. | 348/152 |
| 2008/0019561 A1* | 1/2008 | Tani et al. | 382/100 |
| 2008/0107328 A1* | 5/2008 | Chen et al. | 382/149 |
| 2008/0316328 A1 | 12/2008 | Steinberg et al. | 348/222.1 |
| 2009/0110236 A1* | 4/2009 | Huang et al. | 382/103 |
| 2009/0123066 A1* | 5/2009 | Moriya et al. | 382/166 |

* cited by examiner

BACKGROUND IMAGE AND MASK ESTIMATION FOR ACCURATE SHIFT-ESTIMATION FOR VIDEO OBJECT DETECTION IN PRESENCE OF MISALIGNMENT

RELATED APPLICATION

This application claims the right of priority under 35 U.S.C. §119 based on Australian Patent Application No. 2009251048 entitled "Background image and mask estimation for accurate shift-estimation for video object detection in presence of misalignment", filed on 18 Dec., 2009 in the name of Canon Kabushiki Kaisha, the entire contents of which are incorporated herein by reference as if fully set forth herein.

TECHNICAL FIELD

The present disclosure relates to image processing and, in particular, to determining a background image and mask from a background model for accurate shift-estimation between an input frame and the background model for video object detection in the presence of misalignment between an input frame and stored background model.

DESCRIPTION OF BACKGROUND ART

Video cameras are omnipresent nowadays, mostly for surveillance purposes. The cameras capture more data (video content) than human viewers can process in a timely manner. Therefore, there is a need for automatic analysis of video content. One step in a method for processing video content is the segmentation of video data into foreground objects and a background scene, or "background". Such segmentation allows for further analysis of the video content, such as detection of specific foreground objects, or tracking of moving objects.

One type of video camera is a Pan-Tilt-Zoom (PTZ) camera, which has the capability to change its field of view via panning, tilting, zooming, or any combination thereof. PTZ cameras may change their field of view without human intervention, based on preset orientations, or even based on observed video content. For example, when a PTZ camera is tracking a walking person, the camera may pan to keep the person within the field of view of that camera. Therefore, automatic analysis is highly relevant to PTZ cameras.

Video object detection (VOD) approaches typically process one or more video frames from a video sequence and often create a background model based on video frames that have previously been processed, pre-populated training data, or a combination thereof. VOD approaches process content from an input video frame to classify blocks in the input video frame as belonging to either foreground or background of a scene captured by the input video frame, based on an associated background model. VOD approaches usually assume that an input frame from a video sequence is aligned with previous frames in the video sequence. A misalignment between the input frame and the background model can affect the matching of the input frame with the background model and consequently may result in the false classification of blocks in the input frame. Thus, misalignment estimation between a background model and an input frame is required to avoid falsely classifying blocks as non-background due to misalignment.

One existing misalignment estimation approach estimates the misalignment between an input frame from a video sequence and previous frames in the video sequence by using the input frame and a reference frame representing the background. The disadvantage of this approach is that a reference frame representing the background is required. Such reference frames are not available in VOD algorithms that use a multiple models based background modelling approach.

Another existing misalignment estimation approach uses the past two processed frames for misalignment estimation. A disadvantage of this approach is its reliance on the assumption that the past two processed frames are a good representation of a current input frame. However, this assumption is not always valid. For example, if a video camera is pointing at a lift door and the previous two processed frames captured a scene with a closed door scenario and a current input frame shows a scene with an open door scenario, then the two previously processed frames are not a good representation of the current input frame for the purposes of misalignment estimation.

Thus, a need exists for an improved method for video object detection in the presence of misalignment.

SUMMARY

It is an object of the present invention to overcome substantially, or at least ameliorate, one or more disadvantages of existing arrangements.

According to a first aspect of the present disclosure, there is provided a computer-implemented method of aligning an input video frame from a video sequence with a background model. The background model may be associated with the video sequence. The background model includes a plurality of model blocks, each one of the plurality of model blocks being associated with at least one mode, wherein each mode includes a plurality of frequency domain attributes. The method selects, for each one of the plurality of model blocks, a reference mode from the at least one mode associated with a corresponding model block, and then generates a background reference image comprising the plurality of selected reference modes. The method then aligns the input frame with the background model, based on the background reference image.

According to a second aspect of the present disclosure, there is provided a computer readable storage medium having recorded thereon a computer program for aligning an input video frame from a video sequence with a background model, wherein the background model includes a plurality of model blocks, each one of the plurality of model blocks being associated with at least one mode, wherein each mode includes a plurality of frequency domain attributes. The computer program includes code for performing the steps of: selecting, for each one of the plurality of model blocks, a reference mode from the at least one mode associated with a corresponding model block; generating a background reference image comprising the plurality of selected reference modes; and aligning the input frame with the background model, based on the background reference image.

According to a third aspect of the present disclosure, there is provided an apparatus for aligning an input video frame from a video sequence with a background model, wherein the background model includes a plurality of model blocks, each one of the plurality of model blocks being associated with at least one mode, wherein each mode includes a plurality of frequency domain attributes. The system includes a storage device for storing a computer program and a processor for executing the program. The program includes code for performing the method steps of: selecting, for each one of the plurality of model blocks, a reference mode from the at least one mode associated with a corresponding model block; generating a background reference image comprising the plurality of selected reference modes; and aligning the input frame with the background model, based on the background reference image.

According to a fourth aspect of the present disclosure, there is provided a computer-implemented method of generating a composite reference image to align an input image for video object detection. The method includes the steps of: receiving a background model, the background model comprising a plurality of model blocks, each one of the plurality of model blocks being associated with a plurality of modes, wherein each mode includes a plurality of frequency domain attributes; for each one of the model blocks, selecting a reference mode from the plurality of modes associated with that block, based on the input image; and generating a composite reference image comprising a plurality of reference blocks, wherein each reference block is associated with the reference mode of the corresponding model block.

According to a fifth aspect of the present disclosure, there is provided a computer-implemented method of generating a composite reference image to correct misalignment in an input image. The method includes the steps of: receiving a background model, the background model comprising a plurality of model blocks, each one of the plurality of model blocks being associated with a plurality of modes, wherein each mode includes a plurality of attributes; selecting for each one of the model blocks, based on the input image, a reference mode from the plurality of modes associated with the respective model block; and generating a composite reference image comprising a plurality of reference blocks, each reference block being associated with the reference mode selected for the corresponding model block.

According to another aspect of the present disclosure, there is provided an apparatus for implementing any one of the aforementioned methods.

According to another aspect of the present disclosure, there is provided a computer program product including a computer readable medium having recorded thereon a computer program for implementing any one of the aforementioned methods.

Other aspects of the invention are also disclosed.

BRIEF DESCRIPTION OF THE DRAWINGS

One or more embodiments of the invention will now be described with reference to the following drawings, in which.

DETAILED DESCRIPTION

Figure 1A:
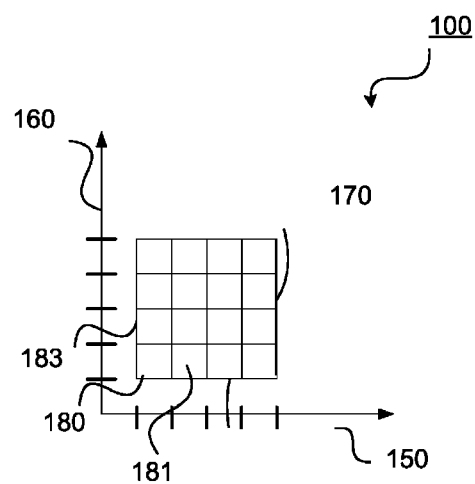
FIG. 1a is a schematic representation of a co-ordinate frame axis system.

Where reference is made in any one or more of the accompanying drawings to steps and/or features that have the same reference numerals, those steps and/or features have for the purposes of this description the same function(s) or operation(s), unless the contrary intention appears.

A video is a sequence of images or frames. Thus, each frame is an image in an image sequence (video sequence). Each frame of the video has an x axis and a y axis. A scene is the information contained in a frame and may include, for example, foreground objects, background objects, or a combination thereof. A scene model is stored information relating to a background. A scene model generally relates to background information derived from an image sequence. A video may be encoded and compressed. Such encoding and compression may be performed intra-frame, such as motion-JPEG (M-JPEG), or inter-frame, such as specified in the H.264 standard. An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream. A visual element position (henceforth referred as position) in the frame axis is represented by x and y coordinates of the visual element under consideration.

FIG. 1a shows a co-ordinate system 100 with an x-axis 150 and a y-axis 160. A video frame 170 is shown in the x-y coordinate system 100. The video frame 170 is divided into a plurality of visual elements. In this particular example, the video frame 170 is divided into a 4×4 grid of visual elements. A first visual element 180 has coordinates (x=1, y=1). A second visual element 181 has coordinates (x=2, y=1). A third visual element 183 has coordinates (x=1, y=2), and so on.

This description considers two representations of visual elements. The first representation is a pixel visual element. In one embodiment, each visual element has three (3) values describing the visual element. In one example, the three values are Red, Green and Blue colour values (RGB values). The values representing characteristics of the visual element are termed as visual element attributes. The number and type of values associated with each visual element (visual element attributes) depend on the format utilised for the apparatus implementing an embodiment of the present disclosure. It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

The second type of representation uses 8×8 DCT blocks as visual elements. The visual element attributes for an 8×8 DCT block are 64 luminance DCT coefficients and average chrominance values of the block. The 64 luminance DCT coefficients can be further divided into 1 DC coefficient, and 63 AC coefficients. The DC coefficient is a representation of average luminance value of the visual element and the AC coefficients represent the frequency domain information of the luminance characteristics of the 8×8 block. The AC coefficients are commonly ordered from lowest-frequency to highest-frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving 66 attributes in total. Many other combinations of attributes are possible or other attributes can be generated from the above mentioned attributes using machine learning algorithms, such as linear regression techniques.

It is to be noted that the described method may equally be practised using other representations of visual elements. For example, the DCT blocks can be of a different size to enable a different granularity for storing the attributes of the pixels represented by the DCT blocks. Other transforms, such as wavelet transforms, can also be used to generate representative attributes from the pixels within a scene so that a historical representation of the scene can be accumulated.

Disclosed herein are a computer-implemented method, system, and computer program product for aligning an input video frame from a video sequence with a background model associated with said video sequence. The background model includes a plurality of model blocks, wherein each one of the plurality of model blocks is associated with at least one mode. Each mode includes a plurality of frequency domain attributes. Input video frames received for processing are often not aligned correctly with a background model. Determining a misalignment estimate and using the misalignment estimate to align the input frame with the background model facilitates accurate video object detection in the input frame.

The method selects, for each one of the plurality of model blocks, a reference mode from the at least one mode associated with a corresponding model block. The method then generates a background reference image that includes the plurality of selected reference modes. In one implementation, each reference mode is a mode selected from the set of modes associated with the corresponding model block from the background model. The method then aligns the input frame with the background model, based on the background reference image.

In one implementation, the method applies an inverse transformation process to the background reference image to generate a background image and then compares the input image with the background image to determine a misalignment estimate. The method then uses the misalignment estimate to shift the input frame to align the input frame with the background model.

Figure 1B:
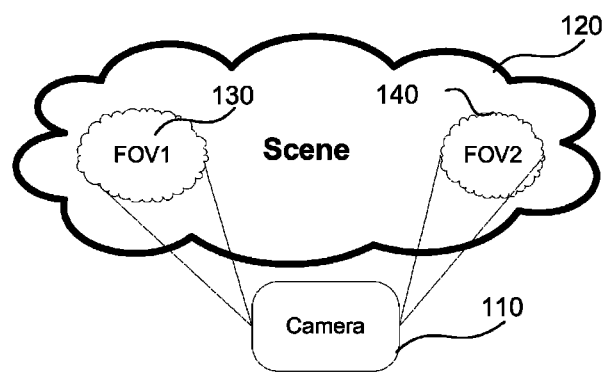
FIG. 1b is a schematic representation of a scenario in which a camera captures video frames of a scene, wherein the scene is larger than the field of view of the camera.

A camera may be used to capture one or more video frames representing the visual content appearing in a Field of View (FOV) of the camera. Henceforth, the term "video frames" is used to represent video frames of a FOV, unless otherwise specified. In the case of a pan-tilt camera, the orientation of the camera may be altered to change the field of view. The camera may therefore capture video frames of a scene, with the scene being larger than the field of view of the camera. FIG. 1b illustrates an example of a scenario in which a camera captures video frames of a scene, wherein the scene is larger than the field of view of the camera. FIG. 1b shows a pan-tilt-zoom (PTZ) camera 110. A scene 120 can be covered by the pan-tilt camera 110 using the range of pan, tilt, and zoom settings available to the camera. A first FOV 130 and a second FOV 140 within the scene 120 are shown. Each of the first FOV 130 and the second FOV 140 corresponds to different pan, tilt, and zoom settings of the camera 110. The camera 110 captures video frames from FOV1 130 and FOV2 140. In one embodiment, the camera may switch between FOV1 and FOV2 in a pre-defined schedule, such as a cyclic schedule covering FOV1 for 5 minutes and then FOV2 for 5 minutes, and so on.

Separation of visual elements appearing in the video frames into foreground objects and background may be achieved in many different ways. A common approach to foreground/background segmentation is background subtraction. For example, a previous frame from a video sequence that is being processed may be used as a reference frame. An input frame is compared against the reference frame and pixels with significant differences are considered to contain foreground objects. Another approach for foreground/background segmentation involves creating a statistical model from previous images in the video sequence, for example, by recording the median pixel value for all positions. A pixel value in the input frame is compared with the median pixel value at that position from previous frames. If the current pixel value is similar to the median pixel value, the pixel is considered to belong to the background, otherwise the pixel is considered to belong to a foreground object.

Frame differencing compares two frames to identify foreground objects. In general, frame differencing utilises an input frame and the frame that immediately preceded the input frame. The preceding frame used for frame differencing is termed the "reference frame". The comparison between the input frame and the reference frame determines a Difference Measure (DM) value for each visual element in the current input frame. The DM value for a visual element in the current input frame is calculated using the visual element from the reference frame at the corresponding position in the frame axis. The DM value represents the difference between two visual elements. In one arrangement, the DM value for coordinates (x,y) in the input frame is estimated using the expression:

$$DM(x, y) = \sum_{i=1}^{N} |w_i(A_{ic} - A_{ip})| \qquad \text{Equation (1)}$$

Here, N represents the total number of attributes for the visual element. As described above, there are 3 attributes per visual element, and there are 66 attributes per DCT block. $w_i$ represents a weight factor for an $i^{th}$ attribute. $A_{ic}$ and $A_{ip}$ represent the $i^{th}$ attribute of the current frame and the previous frame, respectively, at position (x,y). The above expression for determining DM is also known as the weighted sum of absolute differences.

There are many other methods that may also be used for determining a DM value, such as Mean Square Error, etc. It is to be noted that the problem of estimating a Difference Measure for complex background models may not be simple. For example, when the visual element is an 8×8 block with DCT coefficients, the Difference Measure needs to be defined over multiple dimensions. In one arrangement, machine learning techniques, such as Support Vector Machines and Naïve Bayes classifiers, are used to map multi-dimensional input values to one probability value. The resulting value indicates the probability that a mode model matches the input visual element.

A foreground/background classification threshold is used to classify the visual elements of the current frame into foreground objects and background. If the DM value for a visual element is higher than the foreground/background classification threshold value, the visual element is classified as foreground, otherwise the visual element is classified as background. The performance of the foreground/background classification depends on the threshold value. A low foreground/background classification threshold value may result in many false foreground object detections and a high foreground/background classification threshold value may miss many foreground object detections. The foreground/background classification threshold value can be set either by a user using the system or the foreground/background classification threshold value may be a predetermined value estimated based on training data using machine learning techniques, such as Naïve Bayes algorithm.

Figure 1C:
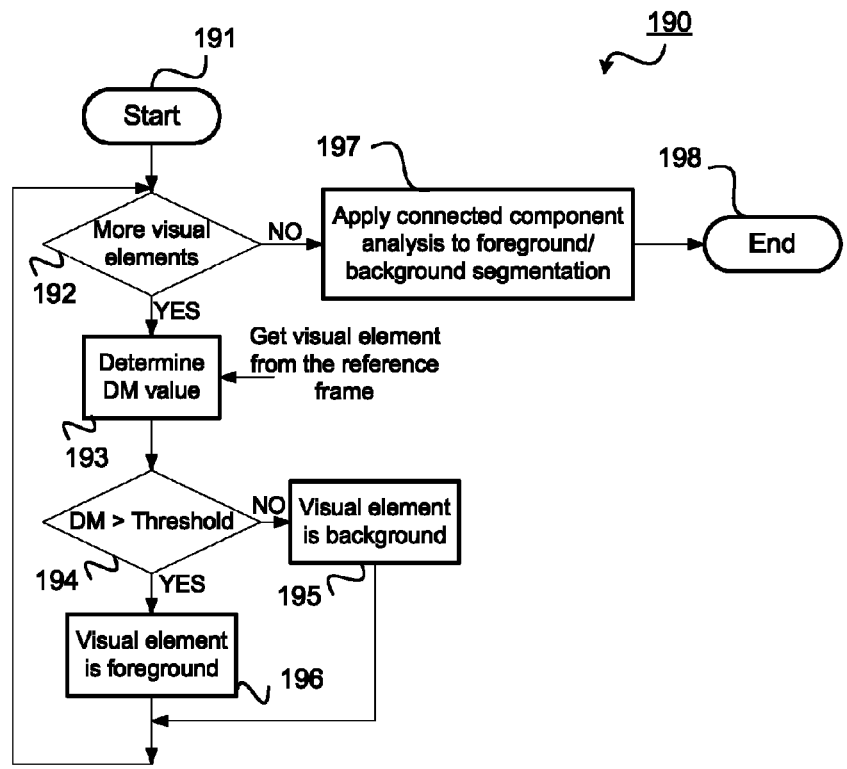
FIG. 1c is a flow diagram illustrating a foreground detection process utilising a reference frame and an input frame with foreground object.

FIG. 1c is a flow diagram 190 that illustrates a foreground object detection process for an input frame using the frame-differencing method. The process 190 starts when an input frame selected from a video sequence arrives for processing at a Start step 191. The input frame can be recorded live from a camera or read from a storage medium, such as memory, or hard disk, etc. In one arrangement, the visual elements of the input frame are processed sequentially in row major order. Other processing flows such as column major or processing in parallel may also be used.

Control passes to a visual element selection block 192, which checks if there are visual elements that are yet to be processed. If there are visual elements remaining, Yes, the process continues to DM value determiner 193, for processing a next visual element. DM value determiner 193 determines a DM value for the visual element by comparing the visual element being processed from the input frame with a corresponding visual element at the same position in the reference frame. The reference frame is an input to DM value determiner 193. In the exemplary embodiment, the whole reference frame is provided as an input to 193, so that a DM value can be determined. However, a predetermined or random portion of the reference frame can be used to determine the DM value as well, depending on the particular application.

Control passes to a DM thresholder decision step 194, which compares the DM value determined in step 193 with a foreground/background classification threshold to classify the block as foreground or background. If the DM value is less than or equal to the foreground/background classification threshold, control passes to a background classifier 195, which classifies the visual element as background. If the DM value is greater than the foreground/background classification threshold, control passes to the foreground classifier 196, which classifies the visual element as foreground. After the visual element is classified as background in step 195 or classified as foreground in step 196, the processing continues to the visual element selection block 192 to check if there are further visual elements remaining to be processed. If there are no more visual elements to be processed, No, the segmentation process is complete at the visual element level.

In one arrangement, optional post-processing steps are performed, as shown by connected component analysis step 197. Control passes from step 192 to step 197, which performs connected component analysis on the segmentation results using techniques such as flood fill. In another arrangement, a further post-processing step removes small connected components. After post-processing in step 197, control passes to End step 198 and the process ends with respect to the input frame. The process 190 can then be repeated for other frames in the sequence.

Figure 1D:
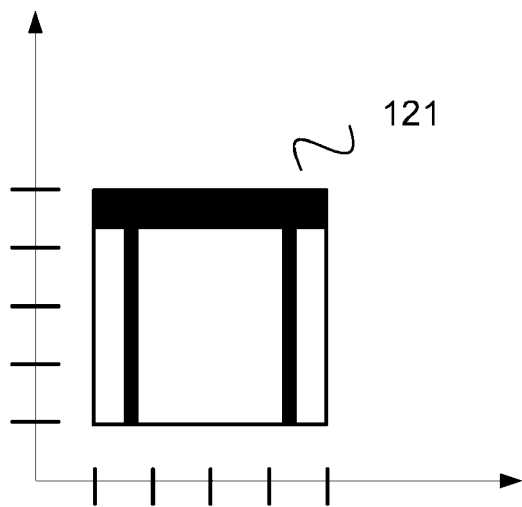
FIG. 1d illustrates an example of a reference frame and input frame pairing.
Figure 1D:
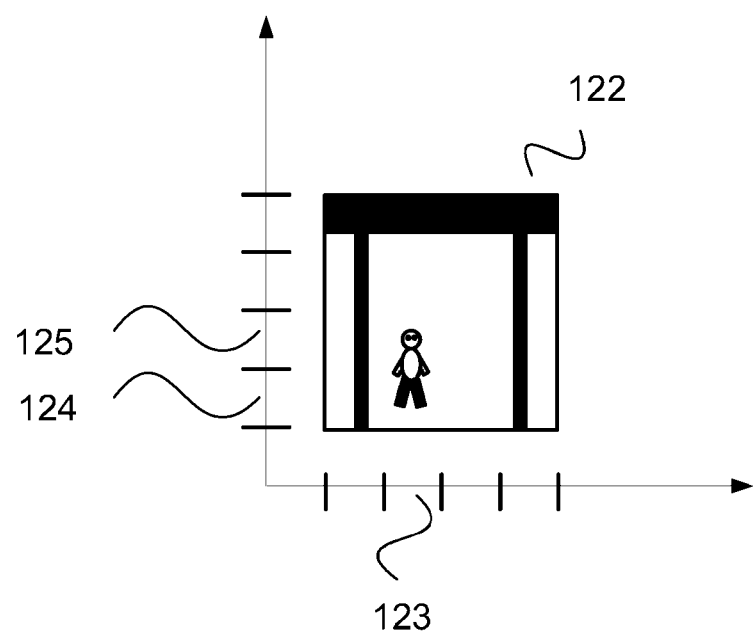

FIG. 1d shows an example of a reference frame 121 and an example of an input frame 122. In the example of FIG. 1d, visual elements of the input frame 122 with coordinates (x=2, y=1) (shown at the intersection of the column 123 and the row 124 respectively) and (x=2, y=2) (shown at the intersection of the column 123 and the row 125 respectively) will be marked as foreground.

Figure 2A:
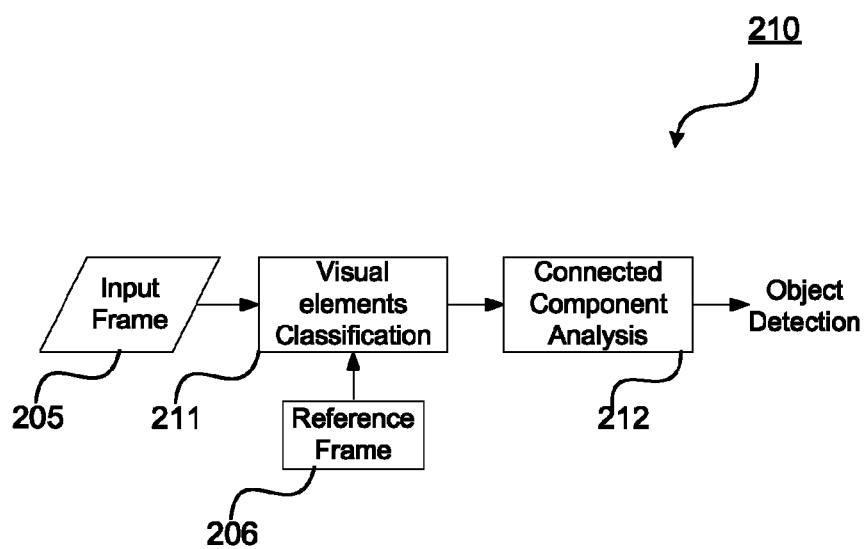
FIG. 2a is a schematic block diagram representation of video object detection using the frame-differencing method.

FIG. 2a is a flow diagram 200 that illustrates a higher level view of the object detection process 190 of FIG. 1c. The flow diagram 200 shows an input frame 205 and a reference frame 206 presented to a visual element classifier 211. The visual element classifier 211 classifies visual elements in the input frame 205 as either foreground or background. The visual element classifier 211 presents an output to a connected component analyser 212, which performs connected component analysis on the output of the visual element classifier 211.

The frame-differencing method does not handle situations in which a previous frame is not a suitable reference image to represent the background of a current field of view. This may happen in many scenarios, such as when there is a repetitively or slowly changing background. For example, such a changing background can arise when a field of view includes a door that is open sometimes and closed at other times. Another example is where slow changes occur, such as an object moving very slowly, etc., meaning that the past frame is not a suitable reference image.

These challenges in video object detection are handled by modelling the background. One embodiment utilises attributes of visual elements that represent the field of view to model the background by using a statistical function of the attributes of the visual elements. For example, for a visual element position (i.e., a specific x and y coordinate), a visual element model is created that is derived from a statistical function of visual element attributes at the same coordinates from multiple frames, such as the mean or median of the attributes. Accordingly, a visual element model in the background model may have a fixed value of R=100, G=150, B=200, or luminance=123.45, or transform coefficients {−50, 28, 76, 38}. The representation of the attributes of a visual element model does not necessarily relate to any one specific visual element in the history used as input to the statistical function. Also, other statistical characteristics, such as the variance of the attributes, may also be estimated and used in visual element classification. For example, the variance for a visual element model may be used to determine a threshold value used to classify the input visual element into foreground object or background, as used in the processing block 194. The background model of the field of view is the set of visual element models of all positions in the frame.

In another embodiment, background modelling is further improved by creating multiple modes in a visual element model for a position in the frame. Multiple modes are created to represent multiple states of the background that cannot be efficiently represented using a single model. One example of multiple states is an elevator light that may be on or off. In such a case, a first mean/standard deviation pair is used to represent the "on" state of the light, and a second mean/standard deviation pair is used to represent the "off" state of the light.

Another example is maintaining a mixture-of-Gaussians (MOG) model for each pixel value. In an MOG model, one or more Gaussian models are stored for each pixel value, each Gaussian model representing one background state. If an input pixel value for a given pixel is within a predefined distance of the mean value of a Gaussian model, the input pixel value is assigned (classified) as background; otherwise the pixel is assigned (classified) as foreground.

Yet another approach is to divide an input image frame into 8×8 blocks and perform a Discrete Cosine Transform (DCT) on each block. The resulting DCT coefficients of each block are then used to create multiple modes for a background. For each block in a frame (part of a video stream), several mode models are maintained that represent the content at a point in space over a history of many frames. For each mode model, a record is stored of how often the model is active. The similarity in activity for spatially neighbouring blocks is taken into account in determining an active mode for a block in a new input frame. If the minimum distance between the active mode and the stored mode models is higher than a predefined threshold, then a new mode is created for that block. A block is classified as foreground if the active mode of that block has an age that is less than a predefined age threshold. Otherwise, if the active mode of that block has an age that is greater than or equal to the predefined age threshold, the block is classified as background.

Figure 2B:
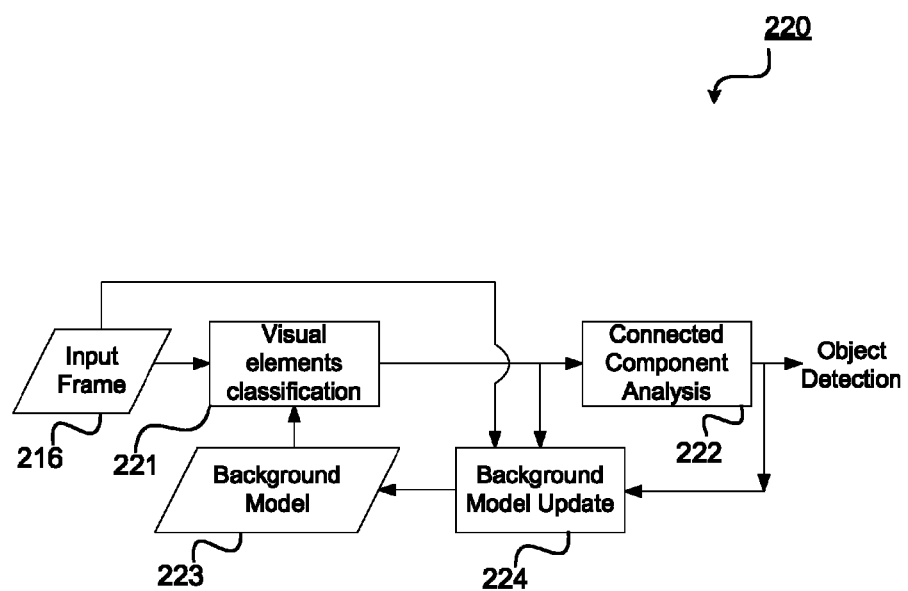
FIG. 2b is a schematic block diagram representation of a background-updating VOD method using a multi-modal background model.

FIG. 2b is a flow diagram 220 that illustrates a background-updating VOD method using a multi-modal background model. An input frame 216 and a background model 223 are presented to a visual elements classifier 221, which compares the current input frame 216 with the background model 223.

Figure 4A:
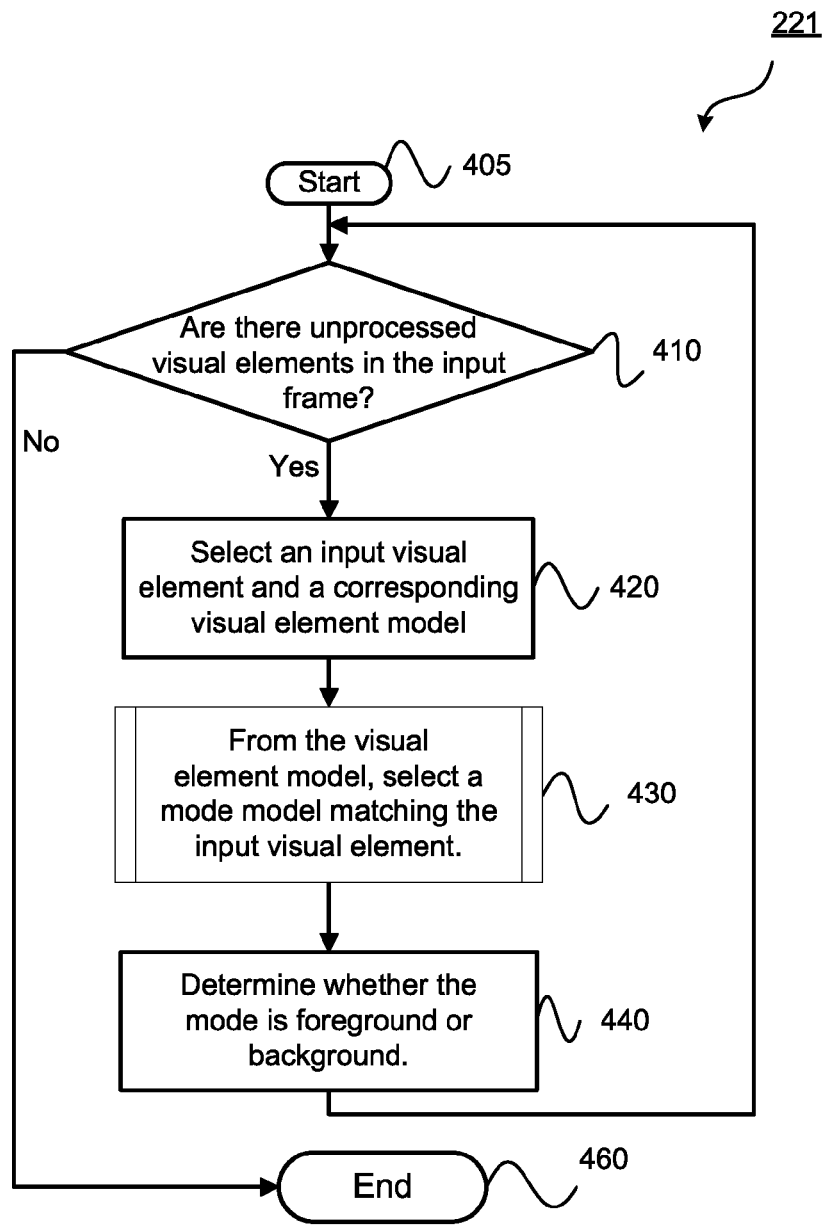
FIG. 4a is a flow diagram illustrating a process for classifying the visual elements.

FIG. 4a is a flow diagram that illustrates a classification process 400 performed by the visual elements classifier 221. The classification process 400 begins at a Start step 405, which receives the input frame 216. Control passes to a checking step 410, which determines whether there are any unprocessed visual elements, such as pixels or blocks. If there are no more visual elements to be processed as determined in checking step 410, No, the classification process is complete at the visual element level and the classification process moves to an End state 460.

If there are more visual elements to be processed at step 410, Yes, control passes to a selecting step 420, which selects an unprocessed visual element and a corresponding visual element model (from the background model 223) for the corresponding position.

A matching block step 430 selects a best matching-mode from among all the modes in the corresponding visual element model.

Figure 4B:
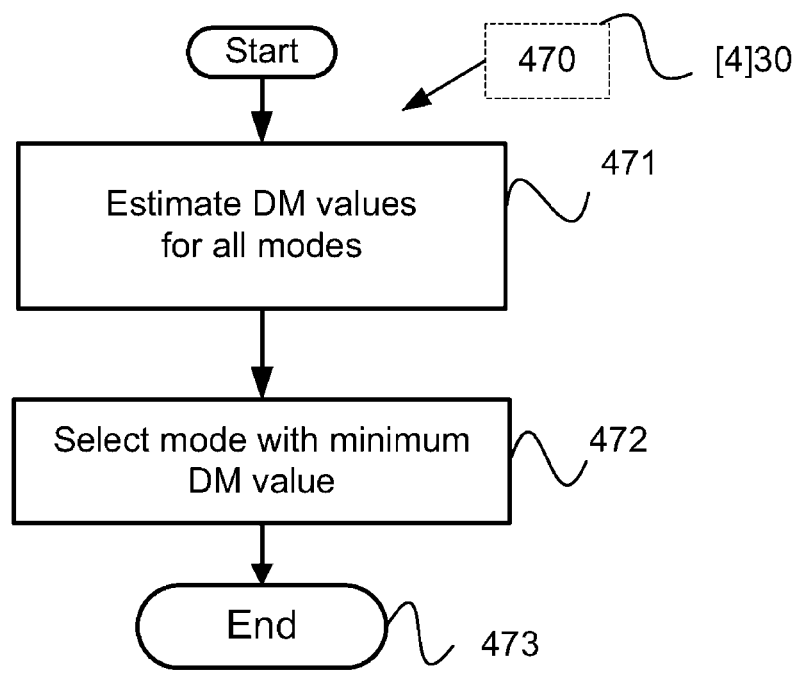
FIG. 4b is a flow diagram illustrating a process for selecting a mode.

FIG. 4b is a flow diagram that illustrates a selection process 470 corresponding to the functionality of step 430. The process 470 begins at a Start step 475 and proceeds to estimating step 471, which estimates a DM value for each mode in the visual element model. Control then passes to selecting step 472, which selects as the matching mode a mode that has the lowest DM value. For example, if there are K modes at a visual element location in the background model, then:

$$DM_{matched-mode} = \min(D_1, D_2 \ldots, D_K) \qquad \text{Equation (2)}$$

The mode which has the lowest DM value is termed as the matching mode. If the lowest DM value is higher than a predefined threshold value, for example 400, a new mode is created in the background model and is set as the matched mode. Control passes from selecting step 472 to an End step 473, and the selection process 470 terminates.

Returning to FIG. 4a, control passes from selecting step 430 to a segmentation step 440, which determines if the matched mode is foreground or background. The matching mode can be classified as foreground or background, or any other set category, in many ways. In one arrangement, a visual element is classified as foreground if the matching mode was created a certain number of frames, say 1000 frames, or seconds, say 200 seconds, ago. In another arrangement, a visual element is classified as foreground if the matching mode has been selected more times than a threshold value.

In another embodiment, spatially neighbouring visual elements are taken into account during mode matching. This is termed "spatial support". In spatial support, temporal characteristics of the matched-modes of neighbouring positions are used to find the DM values. The temporal characteristics can be the number of frames a mode is active, or the frame number when a mode is created, for example.

The new equation to estimate a DM value using spatial support is $$DM(x, y) = \sum_{i=1}^{N} |w_i(A_{ic} - A_{ip})| - SpatialSupport \qquad \text{Equation (3)}$$

The spatial support value may be a predefined value, such as 50, for support from each neighbouring mode that has similar temporal characteristics.

Returning to FIG. 2b, the visual elements classifier 221 presents an output to each of an analysis block 222 and a background model update module 224. The analysis block 222 is similar to the analysis block 212 of FIG. 2a and performs the connected-component analysis. The analysis block presents an output to be utilised for object detection. The output is also presented to the background model update module 224. The updating block 224 receives the input frame 216 and the output from the visual elements classifier 221 and performs the process of updating the background model based on the object detection processing results of the current frame. The visual element models in the background model are updated based on the processing results and the current frame values. In one arrangement, a new mode for a visual element is created if the DM value is higher than a pre-defined new mode threshold value, such as 400, and attributes of the current frame are used to initialise the mode attributes. If the DM value is less than or equal to the new mode threshold value, the matched mode is updated using the attributes of the input visual element. One way of updating the mode attributes is by computing a moving average. It is to be noted that many other techniques, such as median update, may also be used. The background model update module 224 outputs an updated background model to be used as the background model 223 for processing of further input frames by the visual elements classifier 221.

Computer Implementation

Figure 10A:
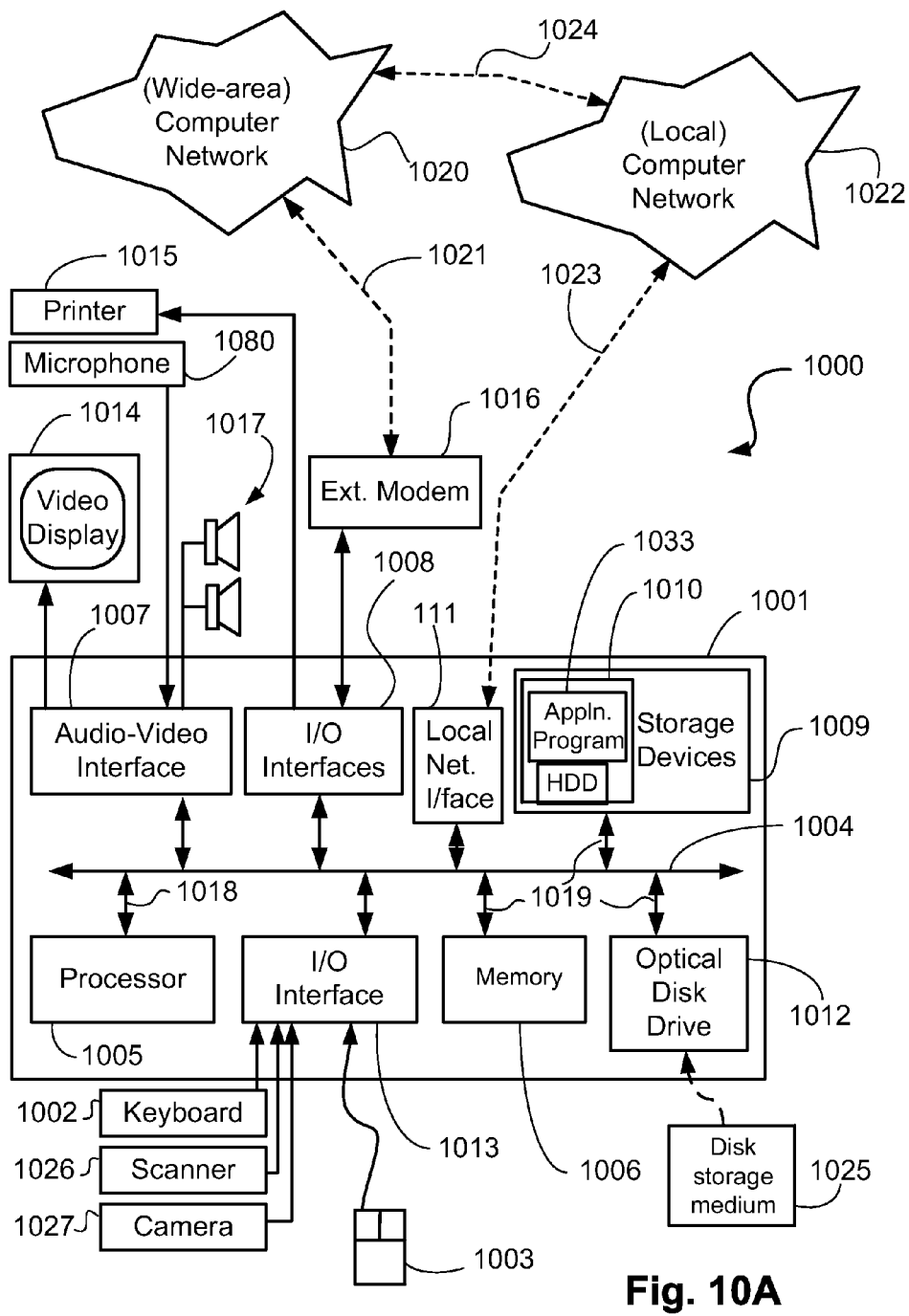
FIGS. 10A and 10B collectively form a schematic block diagram of a general purpose computing system in which the arrangements to be described may be implemented.
Figure 10B:
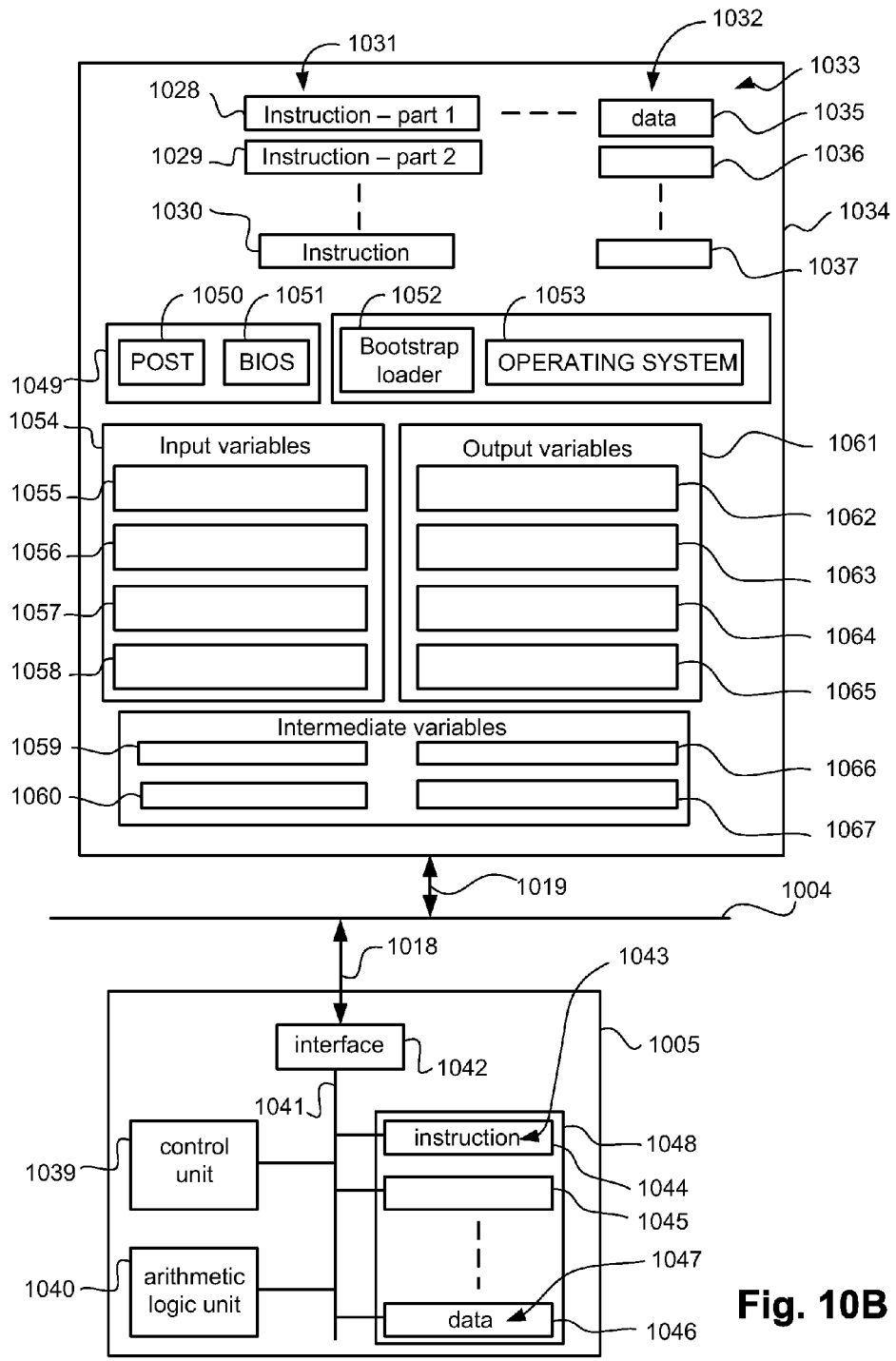

FIGS. 10A and 10B collectively form a schematic block diagram of a general purpose computer system 1000, upon which the various arrangements described can be practised.

As seen in FIG. 10A, the computer system 1000 is formed by a computer module 1001, input devices such as a keyboard 1002, a mouse pointer device 1003, a scanner 1026, a camera 1027, and a microphone 1080, and output devices including a printer 1015, a display device 1014 and loudspeakers 1017.

An external Modulator-Demodulator (Modem) transceiver device 1016 may be used by the computer module 1001 for communicating to and from a communications network 1020 via a connection 1021. The network 1020 may be a wide-area network (WAN), such as the Internet or a private WAN. Where the connection 1021 is a telephone line, the modem 1016 may be a traditional "dial-up" modem. Alternatively, where the connection 1021 is a high capacity (e.g., cable) connection, the modem 1016 may be a broadband modem. A wireless modem may also be used for wireless connection to the network 1020.

The computer module 1001 typically includes at least one processor unit 1005, and a memory unit 1006 for example formed from semiconductor random access memory (RAM) and semiconductor read only memory (ROM). The module 1001 also includes a number of input/output (I/O) interfaces, including an audio-video interface 107 that couples to the video display 1014, loudspeakers 1017 and microphone 1080, an I/O interface 1013 for the keyboard 1002, mouse 1003, scanner 1026, camera 1027, and optionally a joystick (not illustrated), and an interface 108 for the external modem 1016 and printer 1015. In some implementations, the modem 1016 may be incorporated within the computer module 1001, for example within the interface 1008. The computer module 1001 also has a local network interface 1011 which, via a connection 1023, permits coupling of the computer system 1000 to a local computer network 1022, known as a Local Area Network (LAN). As also illustrated, the local network 1022 may also couple to the wide network 1020 via a connection 1024, which would typically include a so-called "firewall" device or device of similar functionality. The interface 1011 may be formed by an Ethernet™ circuit card, a Bluetooth™ wireless arrangement, or an IEEE 802.11 wireless arrangement.

The interfaces 1008 and 1013 may afford either or both of serial and parallel connectivity, the former typically being implemented according to the Universal Serial Bus (USB) standards and having corresponding USB connectors (not illustrated). Storage devices 1009 are provided and typically include a hard disk drive (HDD) 1010. Other storage devices such as a floppy disk drive and a magnetic tape drive (not illustrated) may also be used. An optical disk drive 1012 is typically provided to act as a non-volatile source of data. Portable memory devices, such as optical disks (e.g., CD-ROM, DVD), USB-RAM, and floppy disks, for example, may then be used as appropriate sources of data to the system 1000.

The components 1005 to 1013 of the computer module 1001 typically communicate via an interconnected bus 1004 and in a manner which results in a conventional mode of operation of the computer system 1000 known to those in the relevant art. Examples of computers on which the described arrangements can be practised include IBM-PCs and compatibles, Sun Sparcstations, Apple Mac™, or alike computer systems evolved therefrom.

The method of determining a background image model from the background model (BGM) to be used for misalignment estimation between the current input frame and the background model may be implemented using the computer system 1000 wherein the processes of FIGS. 2-9 may be implemented as one or more software application programs 1033 executable within the computer system 1000. In particular, the steps of the method of producing such a background image model are effected by instructions 1031 in the software 1033 that are carried out within the computer system 1000. The software instructions 1031 may be formed as one or more code modules, each for performing one or more particular tasks. The software may also be divided into two separate parts, in which a first part and the corresponding code modules perform the background model generating methods and a second part and the corresponding code modules manage a user interface between the first part and the user.

The software 1033 is generally loaded into the computer system 1000 from a computer readable medium, and is then typically stored in the HDD 110, as illustrated in FIG. 10A, or the memory 1006, after which the software 1033 can be executed by the computer system 1000. In some instances, the application programs 1033 may be supplied to the user encoded on one or more CD-ROM 1025 and read via the corresponding drive 1012 prior to storage in the memory 1010 or 1006. Alternatively, the software 1033 may be read by the computer system 1000 from the networks 1020 or 1022 or loaded into the computer system 1000 from other computer readable media. Computer readable storage media refers to any storage medium that participates in providing instructions and/or data to the computer system 1000 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 1001. Examples of computer readable transmission media that may also participate in the provision of software, application programs, instructions and/or data to the computer module 1001 include radio or infra-red transmission channels as well as a network connection to another computer or networked device, and the Internet or Intranets including e-mail transmissions and information recorded on Websites and the like.

The second part of the application programs 1033 and the corresponding code modules mentioned above may be executed to implement one or more graphical user interfaces (GUIs) to be rendered or otherwise represented upon the display 1014. Through manipulation of typically the keyboard 1002 and the mouse 1003, a user of the computer system 1000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1017 and user voice commands input via the microphone 1080.

FIG. 10B is a detailed schematic block diagram of the processor 1005 and a "memory" 1034. The memory 1034 represents a logical aggregation of all the memory devices (including the HDD 1010 and semiconductor memory 1006) that can be accessed by the computer module 1001 in FIG. 10A.

When the computer module 1001 is initially powered up, a power-on self-test (POST) program 1050 executes. The POST program 1050 is typically stored in a ROM 1049 of the semiconductor memory 1006. A program permanently stored in a hardware device such as the ROM 1049 is sometimes referred to as firmware. The POST program 1050 examines hardware within the computer module 1001 to ensure proper functioning, and typically checks the processor 1005, the memory (1009, 1006), and a basic input-output systems software (BIOS) module 1051, also typically stored in the ROM 1049, for correct operation. Once the POST program 1050 has run successfully, the BIOS 1051 activates the hard disk drive 1010. Activation of the hard disk drive 1010 causes a bootstrap loader program 1052 that is resident on the hard disk drive 1010 to execute via the processor 1005. This loads an operating system 1053 into the RAM memory 1006 upon which the operating system 1053 commences operation. The operating system 1053 is a system level application, executable by the processor 1005, to fulfil various high level functions, including processor management, memory management, device management, storage management, software application interface, and generic user interface.

The operating system 1053 manages the memory (1009, 1006) in order to ensure that each process or application running on the computer module 1001 has sufficient memory in which to execute without colliding with memory allocated to another process. Furthermore, the different types of memory available in the system 1000 must be used properly so that each process can run effectively. Accordingly, the aggregated memory 1034 is not intended to illustrate how particular segments of memory are allocated (unless otherwise stated), but rather to provide a general view of the memory accessible by the computer system 1000 and how such is used.

The processor 1005 includes a number of functional modules, including a control unit 1039, an arithmetic logic unit (ALU) 1040, and a local or internal memory 1048, sometimes called a cache memory. The cache memory 1048 typically includes a number of storage registers 1044-1046 in a register section. One or more internal buses 1041 functionally interconnect these functional modules. The processor 1005 typically also has one or more interfaces 1042 for communicating with external devices via the system bus 1004, using a connection 1018.

The application program 1033 includes a sequence of instructions 1031 that may include conditional branch and loop instructions. The program 1033 may also include data 1032 which is used in execution of the program 1033. The instructions 1031 and the data 1032 are stored in memory locations 1028-130 and 1035-1037 respectively. Depending upon the relative size of the instructions 1031 and the memory locations 1028-1030, a particular instruction may be stored in a single memory location as depicted by the instruction shown in the memory location 1030. Alternatively, an instruction may be segmented into a number of parts each of which is stored in a separate memory location, as depicted by the instruction segments shown in the memory locations 1028-1029.

In general, the processor 1005 is given a set of instructions which are executed therein. The processor 1005 then waits for a subsequent input, to which the processor reacts by executing another set of instructions. Each input may be provided from one or more of a number of sources, including data generated by one or more of the input devices 1002, 1003, data received from an external source across one of the networks 1020, 1022, data retrieved from one of the storage devices 1006, 1009 or data retrieved from a storage medium 1025 inserted into the corresponding reader 1012. The execution of a set of the instructions may in some cases result in output of data. Execution may also involve storing data or variables to the memory 1034.

The disclosed misalignment estimation and compensation arrangements can use input variables 1054, which are stored in the memory 1034 in corresponding memory locations 1055-1058. The arrangements produce output variables 1061, which are stored in the memory 1034 in corresponding memory locations 1062-1065. Intermediate variables may be stored in memory locations 1059, 1060, 1066 and 1067.

The register section 1044-1046, the arithmetic logic unit (ALU) 1040, and the control unit 1039 of the processor 1005 work together to perform sequences of micro-operations needed to perform "fetch, decode, and execute" cycles for every instruction in the instruction set making up the program 1033. Each fetch, decode, and execute cycle comprises:

(a) a fetch operation, which fetches or reads an instruction 1031 from a memory location 1028;

(b) a decode operation in which the control unit 1039 determines which instruction has been fetched; and (c) an execute operation in which the control unit 1039 and/or the ALU 1040 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 1-9 is associated with one or more segments of the program 1033, and is performed by the register section 1044-1047, the ALU 1040, and the control unit 1039 in the processor 1005 working together to perform the fetch, decode, and execute cycles for every instruction in the instruction set for the noted segments of the program 1033.

The methods of alignment estimation may alternatively be implemented in dedicated hardware such as one or more integrated circuits performing the functions or sub functions to be described. Such dedicated hardware may include graphic processors, digital signal processors, or one or more microprocessors and associated memories.

Figure 2C:
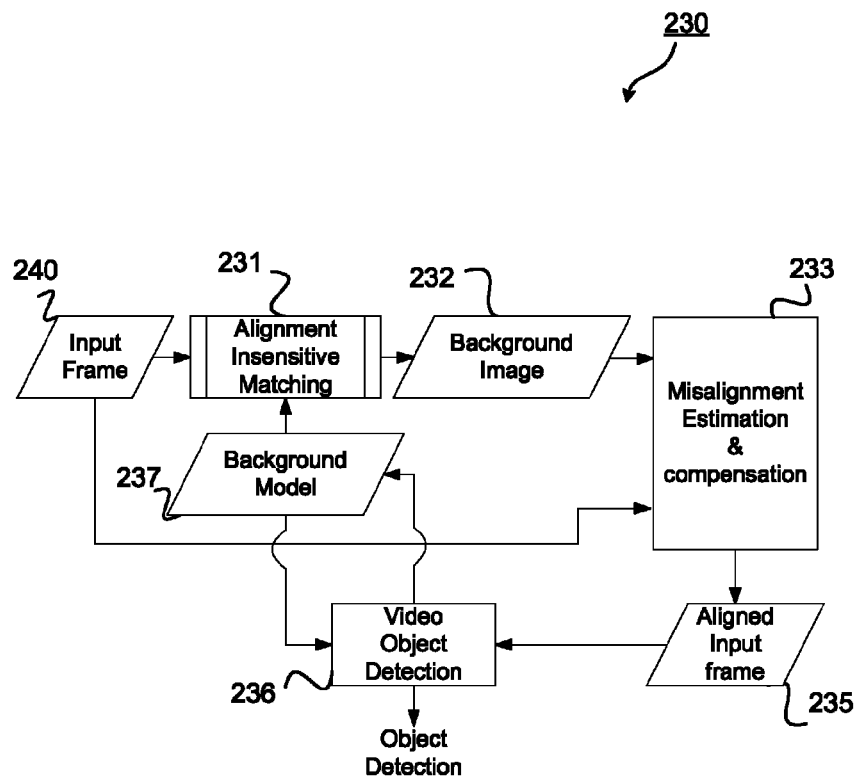
FIG. 2c is a flow diagram illustrating a process for VOD using alignment insensitive matching.

FIG. 2c is a schematic flow diagram illustrating a method 230 of VOD using alignment insensitive matching. The method 230 is preferably implemented as at least part of the application program mentioned above and may be invoked when a VOD function is selected by another application executing on the computer system. In particular, the method 230 operates on input frames captured by a camera 1027. An input frame 240 is selected from a video sequence and presented to each of an alignment insensitive matching module 231 and a misalignment estimation and compensation module 233. The alignment insensitive matching module also receives as an input a background model 237. The output of alignment insensitive matching module 231 is a background image 232, which is the representation of the matching modes of the background model. The background image 232 is presented to the misalignment estimation and compensation module 233.

The background image 232 and the input frame are used in the misalignment estimation and compensation module 233. The output of the misalignment estimation and compensation module block 233 is an aligned input frame 235, which is used for video object detection. The aligned input frame 235 is presented to a video object detection module 236, which represents the processing described above with reference to the background-updating VOD method 220 of FIG. 2b. Video object detection module 236 also updates the background model 237 to be used in the processing of subsequent frames.

Alignment Insensitive Matching

Video object detection using a background modelling approach is sensitive to frame-to-frame alignment noise, because an input visual element is compared with the modes at the same position in the background model. Thus, if an input frame is not aligned to the background model, the DM values are incorrectly estimated, which results in false positive video object detections. The error in DM value estimation depends on the sensitivity of attributes of the visual elements to alignment. For example, DCT coefficient based attributes, especially AC coefficients, are very sensitive to alignment. It is possible to avoid or minimise false object detections due to misalignment by using attributes that are not alignment sensitive. However, alignment sensitivity is essential for accurate video object detection. For example, if an object has moved slightly, a video object detection that is not sensitive to alignment will not detect this movement.

The misalignment between the background model and input frame is corrected by misalignment estimation and compensation. These steps are now discussed in detail.

Figure 8A:
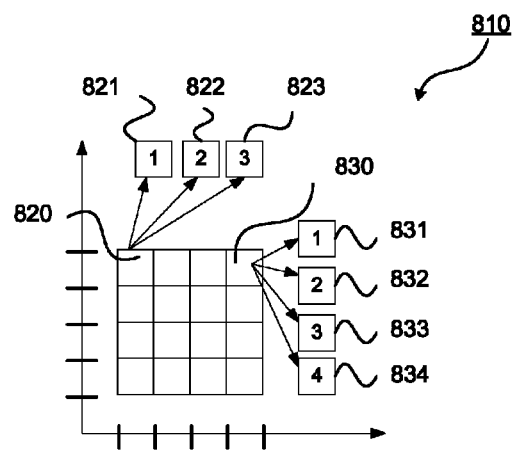
FIG. 8a illustrates an example of a multi-mode background model.
Figure 8B:
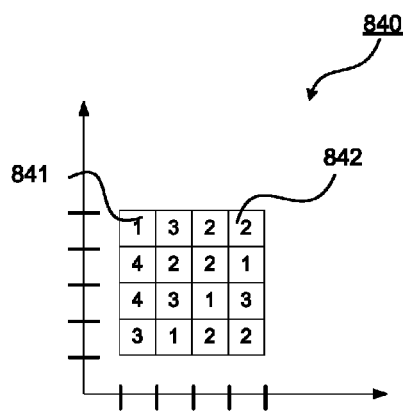
FIG. 8b illustrates an example of a background image.

For misalignment estimation, a representative background image is required from the background model. The representative background image comprises a single mode at each position selected from multiple modes at respective positions. FIG. 8a shows an example of a background model 810 for a particular scene. In this example, the background model 810 is presented as a grid having 4×4 positions (model blocks). Each position is associated with a set of one or more modes. For example, the position 820 is associated with 3 modes 821, 822 and 823. The position 830 is associated with 4 modes 831, 832, 833 and 834. FIG. 8b shows an example of a representative background image 840 formed from the background model 810. The representative background image 840 may be thought of as a composite reference image derived from the background model 810. In the representative background image 840, each position is associated with a single mode. For example, position 841 in the representative background image 840 has mode 1 and position 842 has mode 2 as the selected mode. In one implementation, the processor 1005 generates a background image from the representative background image 840 using an appropriate inverse transformation process. For example, if the modes comprise DCT coefficients, then an inverse DCT process is used to generate the background image.

Using a fixed rule, such as forming a representative background image from the background model by choosing the last matched-mode for each position in the frame, this method will suffer from similar problems as using past frames directly for object detection; that is, the background image generated without using the information from the input frame may not have matching content. The misalignment estimation accuracy depends on matching contents in the two images to be aligned. The misalignment estimation is more accurate if two images share many matching contents. The present disclosure provides an alignment insensitive matching method between the input frame and the background model to determine the representative background image.

Figure 7A:
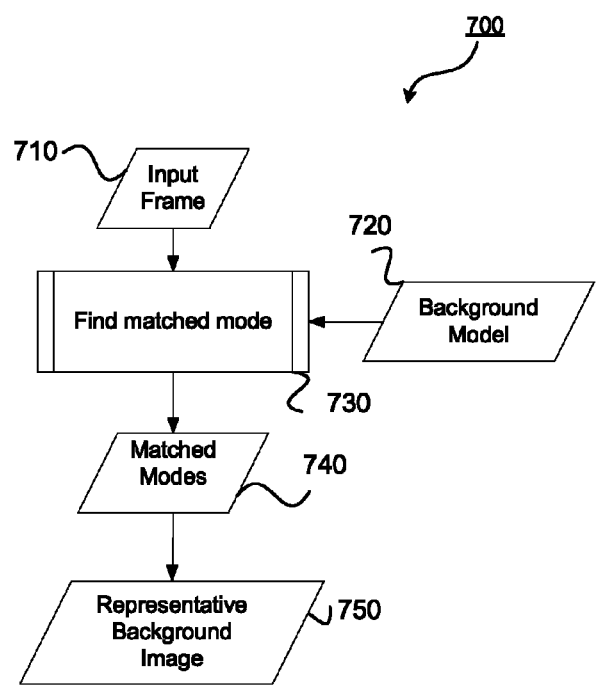
FIG. 7a is a schematic block diagram representation of alignment insensitive matching.

FIG. 7a is a flow diagram illustrating an alignment insensitive matching process 700 according to the present disclosure. An input frame 710 and a background model 720 are presented to a determining step 730, executed by the processor 1005. The determining step 730 finds a matched mode for a subset or all positions of a frame. This determining step 730 will be discussed in more detail later, with reference to FIG. 7b. The determining step 730 executed by the processor 1005 produces a frame containing all the matched modes 740, and these matched modes are used by the processor 1005 to form a representative image 750.

Figure 7B:
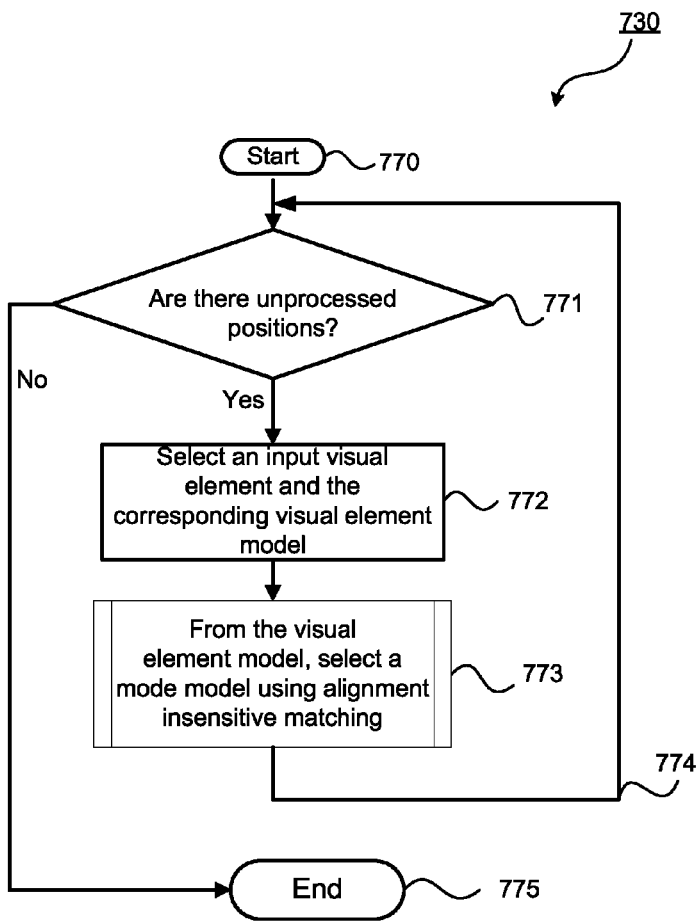
FIG. 7b is a flow diagram illustrating a process for finding a matched mode in alignment insensitive matching.

FIG. 7b is a flow diagram of the determining process 730 of FIG. 7a. The determining process 730 starts at a Start step 770, which receives a new input frame, thereby initialising the processor 1005 to execute the determining process 730. Control passes to a decision block 771, which checks if there are unprocessed positions within a frame of a background model. In the exemplary embodiment, positions are processed in row-major order, but any other order, such as column-major, may equally be used. If all the positions have been processed and there are no unprocessed positions, No, the process ends at End block 775.

If there are unprocessed positions at step 771, Yes, control passes to a selecting block 772, which selects the next position (i.e., visual element) from the input frame in row-major order. The selecting block 772 also selects a corresponding visual element model from the background model at the selected position. A comparing block 773, carried out by the processor 1005, compares the visual element and the visual model using alignment insensitive matching to find a matching mode among multiple modes in the visual model. This comparing and determining block 773 is described in detail later. The process returns via path 774 to decision block 771 to check if there are further visual elements on the background model that have not yet been processed.

The comparing and determining block 773 is now discussed in detail. Each mode in the visual element model is matched with the input visual element by estimating a DM value. The DM value is estimated using visual element attributes that are less sensitive to misalignment. In the exemplary embodiment, attributes based on DCT coefficients are used. The attributes (Y, U and V) are used for matching. The AC coefficients are not used, due to their higher alignment sensitivity.

Figure 3:
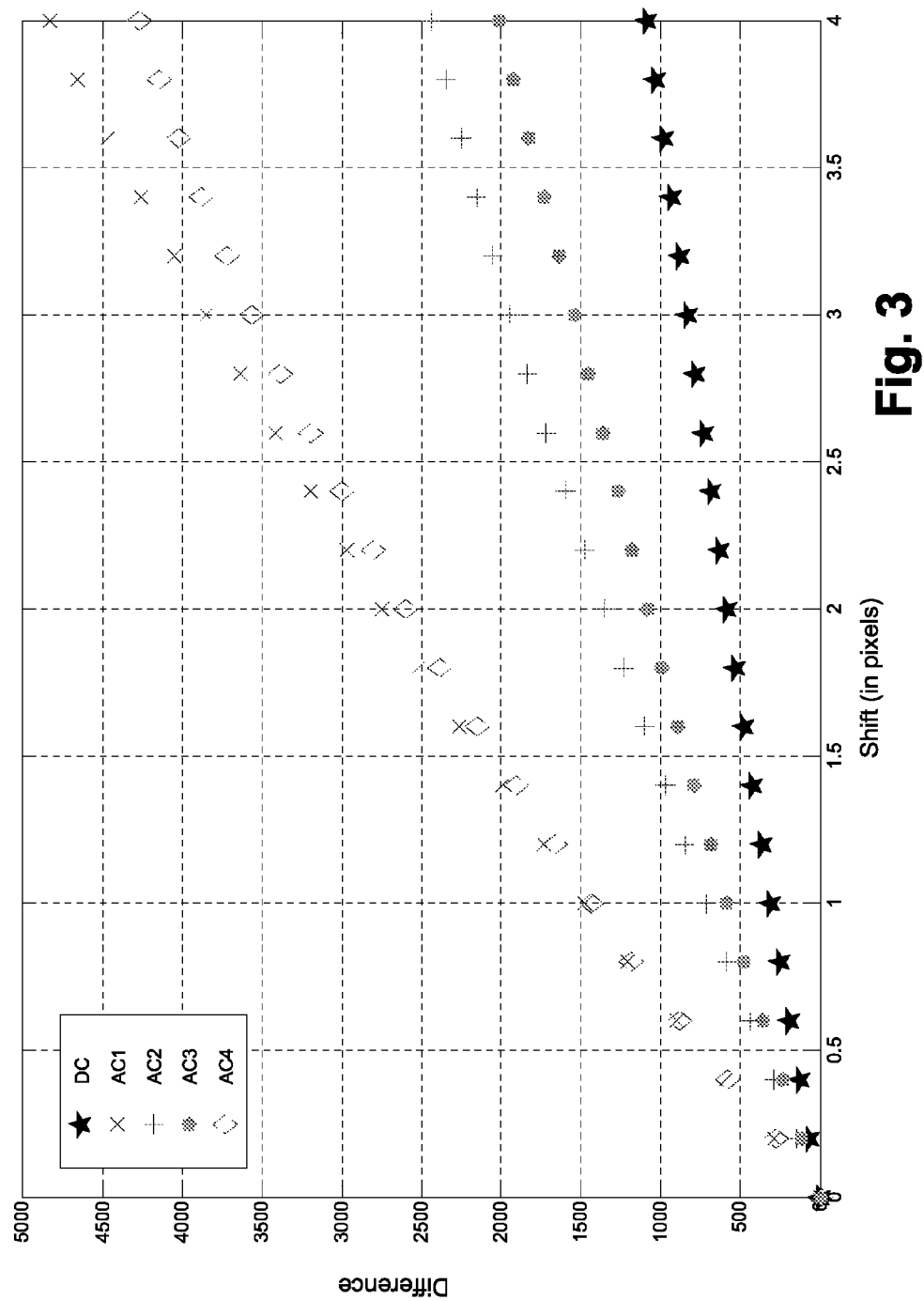
FIG. 3 is a plot showing sensitivity of Y and AC attributes with respect to misalignment.

FIG. 3 shows a plot of change in the Y, AC1, AC2, AC3, and AC4 coefficients due to misalignment in two images. The x-axis represents the misalignment between two images and the y-axis represents the difference in the attributes between the two images. As shown in FIG. 3, the DC component known as the Y attribute is less sensitive to misalignment than the AC coefficients. Thus, this Y attribute can be used to filter out modes that are significantly different from the visual elements of the input frame. Then, higher frequency components may be used to determine one mode from the background model that best represents a particular visual element of the input frame. Spatial support based on information of neighbouring visual elements, as mentioned previously, is also used by the processor 1005 to find the best mode-match. The matched modes are used by the processor 1005 to form the representative background image in forming step 750.

In another embodiment, new attributes may be derived from the existing attributes, such as an "AC energy" attribute. The processor 1005 can compute this attribute as follows:

$$AC\_Energy = \sum_{i=1}^{63} |AC_i| \qquad \text{Equation (4)}$$

In one embodiment, the DC component and the first five (5) AC coefficients are used, as these attributes are less alignment sensitive compared to using all 63 coefficients for estimating the AC_Energy attribute shown above. Other combinations of the AC coefficients may be used.

In yet another embodiment of alignment insensitive matching, each position for which the DM value of the matched mode is higher than a threshold value is considered as part of the foreground mask. The image content at these positions in the input frame and the corresponding positions in the background image are not used for misalignment estimation. In this case, the visual elements that are classified as background are used for misalignment estimation.

The foreground mask estimation allows positions at which the input frame and the background model do not match to be ignored for the purpose of misalignment estimation. This may be because there are foreground objects in the positions corresponding to those visual elements. For example, if the input frame contains a person that has never appeared in previous frames of the video sequence, then the DM value between the matched mode and the input frame will be larger than a threshold value. Then, the visual elements that contain contributions from this person on a frame will not be used for misalignment estimation. The mask estimation process produces a mask. The mask assists in achieving accurate misalignment estimation, especially when there are many non-matching contents in the input frame and the background model.

Figure 5:
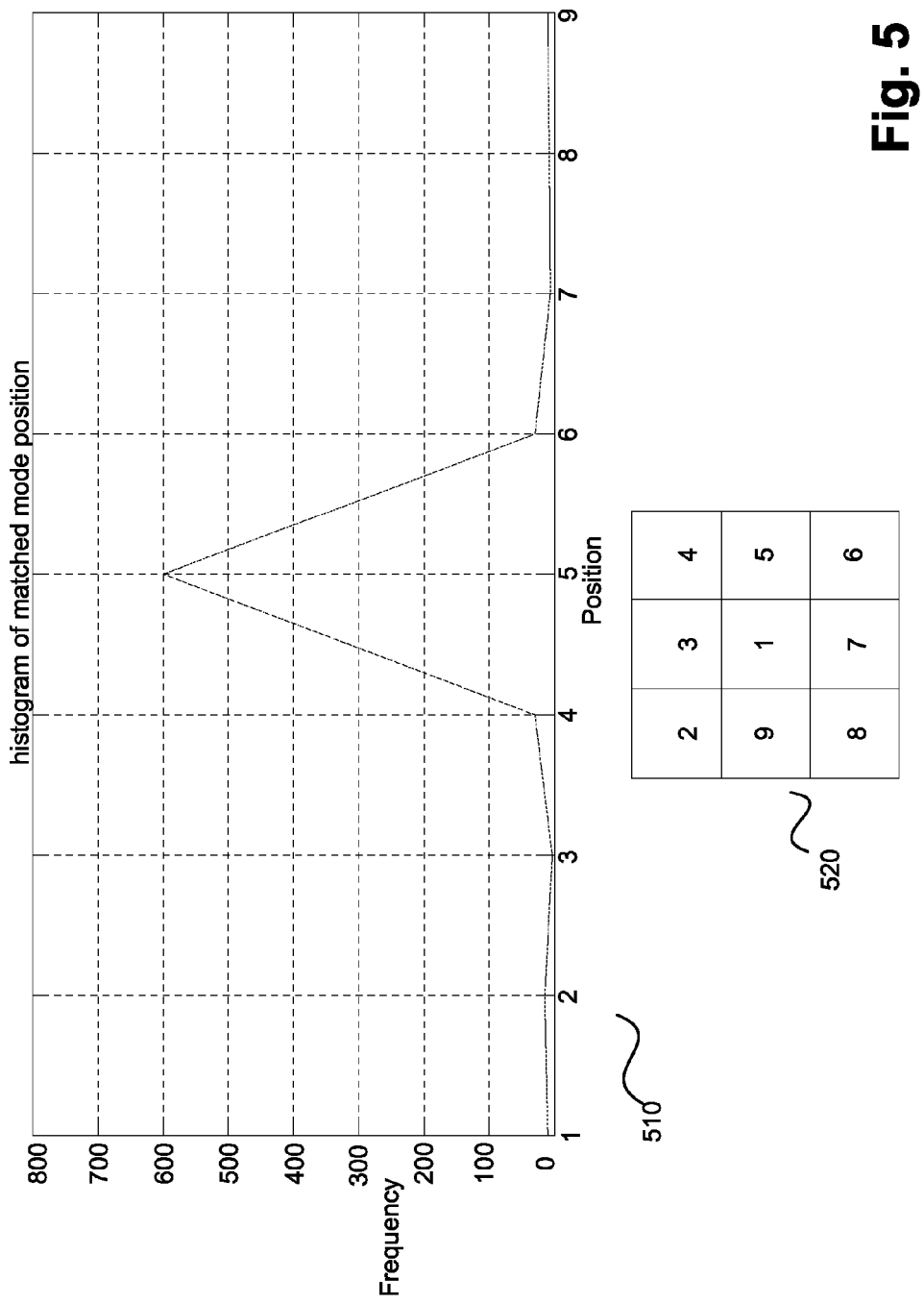
FIG. 5 is a histogram of matched mode position when neighbourhood positions are also considered for matching.

In yet another embodiment, neighbourhood positions are also considered in finding a matched mode during alignment insensitive matching. FIG. 5 illustrates an example in which a 3×3 neighbourhood is chosen to assist in finding a matched mode. FIG. 5 shows a 3×3 block 520 from an input frame. The matched mode for position 1 is determined by considering visual element models for positions 1 to 9. The position offset where the best matched mode is found is recorded for a subset or all visual elements. The subset can be determined by taking into account the foreground mask mentioned before, for example. The position offsets of these visual elements are collected and the position offset which has the highest occurrence is selected. For example, FIG. 5 also shows a graph 510 that illustrates a distribution of position offset for a block of 8 neighbourhood positions for a visual element of interest labelled one (1). In this case, position offset in the direction of visual element numbered five (5) is selected because the frequency of position offset is determined to be the highest. A matched mode is re-determined for a subset or all visual elements in the frame, after the visual elements are adjusted using the selected position offset. The representative background image and the mask are formed using the matched mode and the corresponding DM value of all positions.

The representative background image and the input frame are used for misalignment estimation. FIG. 8b is a flow diagram illustrating inputs and output of the alignment estimation and compensation process. The processor 1005 generates a representative background model 850 through alignment insensitive matching. The representative background model 850 is presented to an inverse transformation process 852. The processor 1005 then executes the inverse transform process 852 to convert the representative background model 850 into a background image 853. For example, if the representative background image comprises modes with DCT coefficients, then the inverse DCT is used in the inverse transformation process to produce the background image 853. An input frame 851 and the background image 853 are fed into an alignment estimation and compensation block 854. This estimation and compensation block 854 estimates a misalignment between the input frame and the background image and compensates the input frame for misalignment. The output of the estimation and compensation block 854 is the aligned input frame 855.

The alignment and estimation block 854 is now explained in detail. In one arrangement, the misalignment estimation and compensation step 854 is performed in two steps: first, shift estimation and compensation are performed on a pixel level, followed by another shift estimation and compensation step on a sub-pixel level. Having a combination of two steps for the misalignment estimation and compensation allows for a more accurate shift estimation and compensation.

Figure 8C:
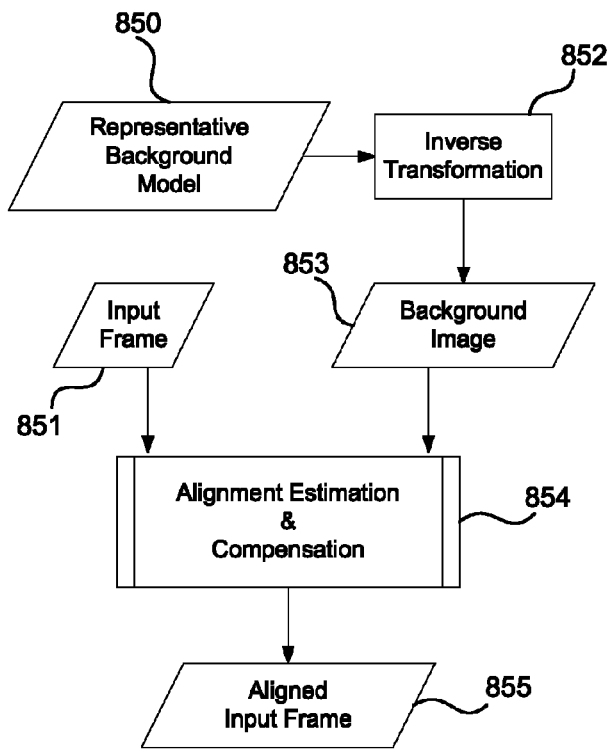
FIG. 8c is a schematic block diagram representation illustrating a process for alignment estimation and compensation.
Figure 9:
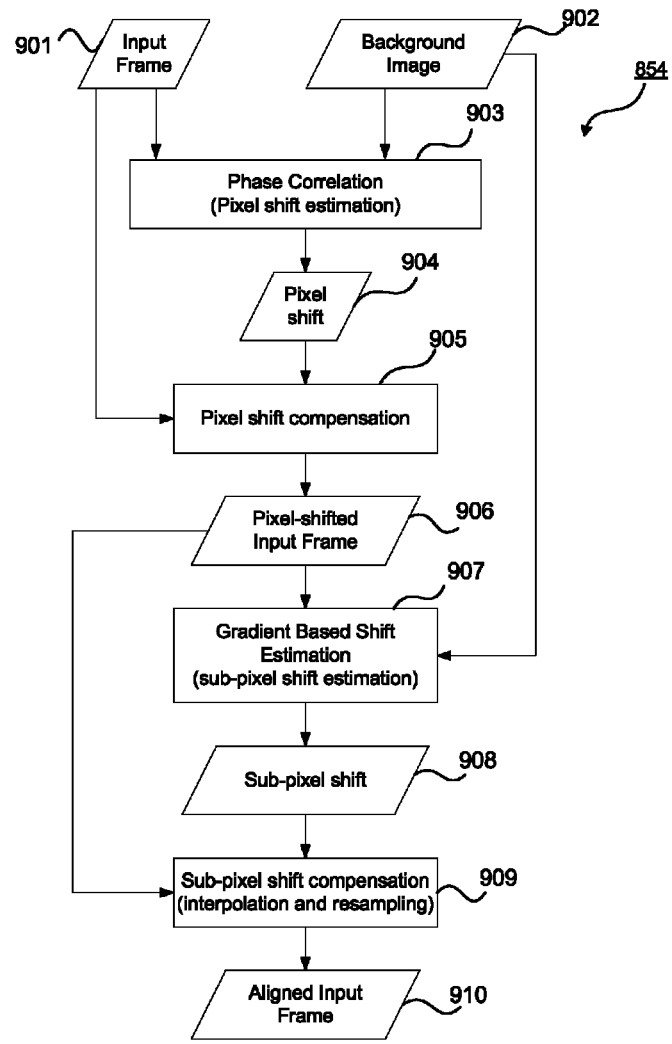
FIG. 9 is a flow diagram illustrating an exemplary misalignment estimation and compensation process.

FIG. 9 is a flow diagram 900 illustrating the misalignment estimation and compensation process 854 of FIG. 8c. The input frame 901 and the background image 902 are presented to a pixel correlation module 903 to estimate the pixel misalignment. The phase correlation algorithm estimates a shift between two images by determining a peak in the normalized cross-correlation of the two images. The output of the phase correlation step 903 is a pixel shift value 904, as estimated by the block 903. The input frame 901 and the pixel shift value are presented to a pixel shift compensation block 905. The pixel shift compensation block 905 pixel shifts the input frame 901 by applying the pixel shift value 904 to the pixel-shifted input frame 906.

The misalignment estimation is further improved by estimating sub-pixel misalignment, as further illustrated in FIG. 9. One exemplary method used for sub-pixel misalignment estimation is gradient based shift estimation (GBSE). The GBSE method is a least squares method to solve for a small shift between two images. The method makes use of the Taylor series expansion of a slightly shifted version of the reference image. Then, the misalignment is corrected by minimizing the approximated Mean Squared Error (MSE) of the two images. The pixel-shifted input frame 906 is presented to a sub-pixel shift estimating block 907. The sub-pixel shift estimating block 907 represents the GBSE process for estimating the sub-pixel misalignment, which outputs the estimated value of the sub-pixel misalignment as a sub-pixel shift value 908.

In this arrangement, the pixel-shifted input frame 906 is compensated for sub-pixel misalignment by using an interpolation and resampling step 909. The interpolation and resampling step 909 receives each of the pixel-shifted input frame 906 and the sub-pixel shift value 908. The interpolation and resampling step 909 interpolates the image using an interpolation filter to obtain an aligned input frame 910. In the exemplary embodiment, a bicubic filter is used as an interpolation filter to obtain the aligned input frame 910.

It is to be noted that many other methods for misalignment estimation and compensation can be used, such as cross correlation for misalignment estimation step 903 and Fourier shift method for misalignment compensation step 909.

Figure 6:
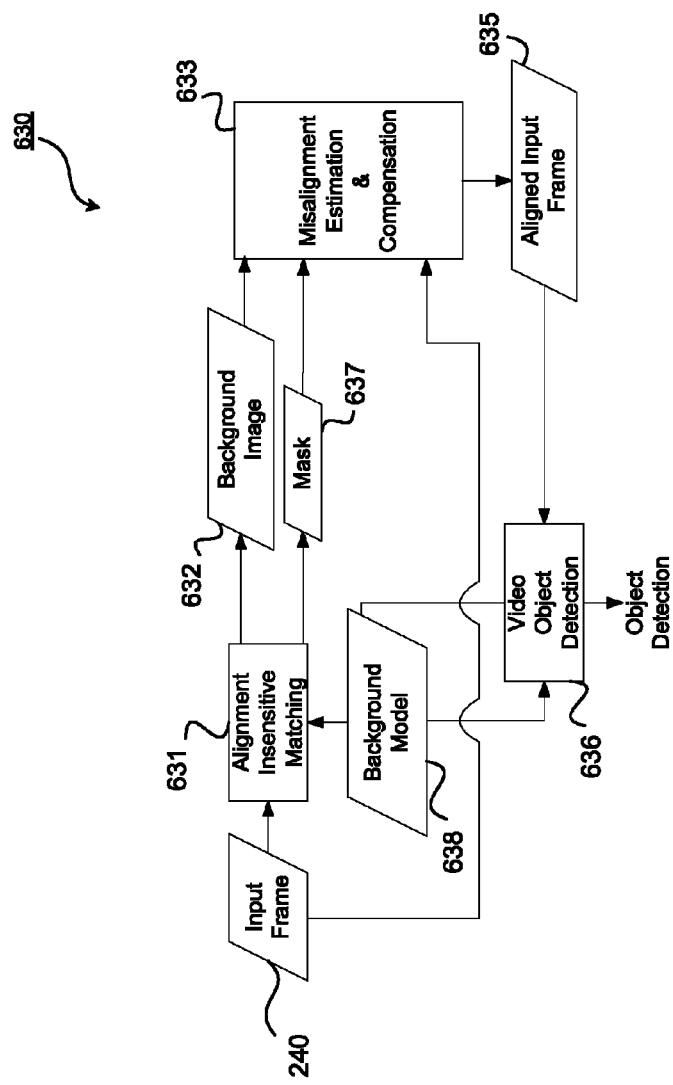
FIG. 6 is a schematic block diagram representation of video object detection with alignment insensitive matching.

FIG. 6 shows a block diagram of an object detection process 630 performed after the misalignment estimation and compensation method shown in FIG. 9. In the exemplary embodiment, a mask 637, which is obtained from the mask generating process described previously, is used. However, in another embodiment, the mask 637 is not required.

In the objection detection process 630, an input frame 240 is presented to each of an alignment insensitive matching block 631 and a misalignment estimation and compensation block 633. The alignment insensitive matching step 631 takes the input frame 240 and a background model 638 and generates a background image 632 and a mask 637. The mask and background image are presented as inputs to the misalignment estimation and compensation 633. The output of the misalignment estimation and compensation block 633 is an aligned input frame 635 (910). The aligned input frame 635 is presented with the background model 638 to a video object detection block 636. The object detection block 636 is similar to the object detection block 236, which performs VOD using the aligned input frame 635 (910) and the background model 638. In the exemplary embodiment, the object detection block 636 also updates the background model 638 based on the aligned input frame, if necessary, to improve the background model of the scene. For example, as mentioned before, the background model may not have a mode containing an opened lift door, so the object detection block 636 will add an "opened lift door" mode to the background model.

Conclusion

The proposed alignment insensitive matching uses a background model and an input frame to estimate a representative background image. This method removes the assumption that the past one or two frames of a video sequence are representative of the current frame. It is possible in many scenarios that the past one or two frames are not representative of current frame; for example, a scenario in which a camera is looking at a lift door. The camera has observed an opened lift door for many frames in the past. Thus, information about an open lift door has been captured in the form of modes in the background model. Now, let us assume that in the past few frames the lift door is closed and in a current input frame the lift door is open again. In this scenario, the past one or two frames are not representative of the current input frame.

By using the background model in the alignment insensitive matching, a more accurate representative background image is formed using the modes representative of open lift door in the background model. This helps in accurate misalignment estimation and compensation of the input frame and, in turns, helps avoiding false object detections due to misalignment.

INDUSTRIAL APPLICABILITY

The arrangements described are applicable to the computer and data processing industries and particularly for the imaging and security industries.

The foregoing describes only some embodiments of the present invention, and modifications and/or changes can be made thereto without departing from the scope and spirit of the invention, the embodiments being illustrative and not restrictive.

I claim:

1. A computer-implemented method of aligning an input video frame from a video sequence with a background model, the background model including a plurality of model blocks, each one of the plurality of model blocks being associated with at least one mode, said method comprising the steps of:
   selecting, for each one of the plurality of model blocks, a reference mode from the at least one mode associated with a corresponding model block, the selected reference mode being a matched mode with background;
   generating a background image from the plurality of selected reference modes;
   estimating misalignment between the input video frame and the generated background image based on the input video frame and the generated background image; and
   aligning the input video frame with the background model for object detection, based on the estimated misalignment,
   wherein each of the modes includes a plurality of frequency domain attributes for object detection, and the background image is generated by applying an inverse transformation process to the plurality of selected reference modes.

2. A non-transitory computer-readable storage medium having recorded thereon a computer program for aligning an input video frame from a video sequence with a background model, the background model including a plurality of model blocks, each one of the plurality of model blocks being associated with at least one mode, said computer program comprising code for performing the steps of:
   selecting, for each one of the plurality of model blocks, a reference mode from the at least one mode associated with a corresponding model block, the selected reference mode being a matched mode with background;
   generating a background image from the plurality of selected reference modes;
   estimating misalignment between the input video frame and the generated background image based on the input video frame and the generated background image; and
   aligning the input video frame with the background model for object detection, based on the estimated misalignment,
   wherein each of the modes includes a plurality of frequency domain attributes for object detection, and the background image is generated by applying an inverse transformation process to the plurality of selected reference modes.

3. An apparatus for aligning an input video frame from a video sequence with a background model, the background model including a plurality of model blocks, each one of the plurality of model blocks being associated with at least one mode, said system comprising:
   a storage device for storing a computer program; and
   a processor for executing the program, said program comprising code for performing the method steps of:
      selecting, for each one of the plurality of model blocks, a reference mode from the at least one mode associated with a corresponding model block, the selected reference mode being a matched mode with background;
      generating a background image from the plurality of selected reference modes;
      estimating misalignment between the input video frame and the generated background image based on the input video frame and the generated background image; and
      aligning the input video frame with the background model for object detection, based on the estimated misalignment,
      wherein each of the modes includes a plurality of frequency domain attributes for object detection, and the background image is generated by applying an inverse transformation process to the plurality of selected reference modes.

4. A computer-implemented method of generating a composite reference image to align an input image for video object detection, said method comprising the steps of:
   receiving a background model, the background model comprising a plurality of model blocks, each one of the plurality of model blocks being associated with a plurality of modes, wherein each mode includes a plurality of frequency domain attributes;
   for each one of the model blocks, selecting a reference mode from the plurality of modes associated with that block, the selected reference mode being a last-matched mode with background; and
   generating a composite reference image comprising a plurality of reference blocks, wherein each reference block is associated with the reference mode of the corresponding model block,
   wherein each of the modes includes a plurality of frequency domain attributes for object detection, and the background image is generated by applying an inverse transformation process to the plurality of selected reference modes.

5. The method according to claim 4, wherein at least one of the plurality of model blocks is masked in the composite reference image.

6. The method according to claim 4, comprising the further steps of:
   aligning the input frame with the background model, based on the composite reference image.

7. The method according to claim 6, comprising the further step of detecting video objects in the aligned input frame, based on the background model.

8. A computer-implemented method according to claim 1, wherein the background image is generated applying an inverse transformation process to a DC component of the plurality of selected reference modes.

9. A computer-implemented method according to claim 1, wherein the background image is generated by applying an inverse transformation process to a DC component and a predetermined number of lowest AC coefficients of the plurality of selected reference modes.

10. A computer-implemented method according to claim 1, wherein a difference measure of the matched mode is higher than a threshold value.

11. A computer-implemented method according to claim 1, wherein the input video frame is captured by a pan-tilt camera, and a field of view of the input video frame is switched from another field of view.

* * * * *